(12) United States Patent
Matsubara et al.

(10) Patent No.: US 7,196,488 B2
(45) Date of Patent: Mar. 27, 2007

(54) MOTOR DRIVING APPARATUS

(75) Inventors: Shunsuke Matsubara, Yamanashi (JP); Shinichi Horikoshi, Yamanashi (JP); Hiroyasu Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/936,543

(22) Filed: Sep. 9, 2004

(65) Prior Publication Data

US 2005/0052144 A1 Mar. 10, 2005

(30) Foreign Application Priority Data

Sep. 9, 2003 (JP) ............................. 2003-316832

(51) Int. Cl.
*G05B 11/28* (2006.01)

(52) U.S. Cl. .................. 318/599; 318/811; 318/432; 318/41; 363/71; 363/72

(58) Field of Classification Search ................ 318/432, 318/434, 599, 811, 41, 77, 83, 151, 111–113, 318/135; 363/71, 72
See application file for complete search history.

(56) References Cited

U.S. PATENT DOCUMENTS

| | | | | |
|---|---|---|---|---|
| 4,825,144 A | * | 4/1989 | Alberkrack et al. | 323/272 |
| 5,031,088 A | * | 7/1991 | Tanaka | 363/71 |
| 5,450,309 A | * | 9/1995 | Rohner | 363/71 |
| 5,657,217 A | * | 8/1997 | Watanabe et al. | 363/71 |
| 5,712,540 A | * | 1/1998 | Toda et al. | 318/46 |
| 6,158,553 A | * | 12/2000 | Oshima et al. | 187/293 |
| 6,377,478 B1 | * | 4/2002 | Morishita | 363/34 |
| 6,486,632 B2 | * | 11/2002 | Okushima et al. | 318/599 |
| 6,813,167 B2 | * | 11/2004 | Nakamura et al. | 363/40 |

FOREIGN PATENT DOCUMENTS

| | | |
|---|---|---|
| JP | 61-154493 | 7/1986 |
| JP | 03-036991 | 2/1991 |
| JP | 06-197593 | 7/1994 |
| JP | 07-213095 | 8/1995 |
| JP | 07-222456 | 8/1995 |
| JP | 8-016246 | 1/1996 |
| JP | 09-205797 | 8/1997 |
| JP | 09-331694 | 12/1997 |

(Continued)

*Primary Examiner*—Rina Duda
(74) *Attorney, Agent, or Firm*—Staas & Halsey LLP

(57) ABSTRACT

A motor driving apparatus capable of drivingly controlling a plurality of inverter units with a single motor driving command from a motor control unit, and thereby control a large-capacity motor or the like. The motor control unit sends out a single motor driving command (torque command) S. An intermediary unit obtains motor driving commands S×A1 to S×A4 for the inverter units by multiplying the motor driving command S by each of coefficients A1 to A4 set in advance. The inverter units are fed with the motor driving commands S×A1 to S×A4 individually and drive a single motor. Since the motor is driven by the total current supplied by the inverter units, the motor can generate a large torque. The motor control unit only needs to generate a single motor driving command S, and hence only needs to operate a single processing part. Hence, the motor control unit can generate and send out motor driving commands for other motors to drive them.

22 Claims, 3 Drawing Sheets

FOREIGN PATENT DOCUMENTS

| | | |
|---|---|---|
| JP | 10-136690 | 5/1998 |
| JP | 11-356090 | 12/1999 |
| JP | 2001-002207 | 1/2001 |
| JP | 2001-086766 | 3/2001 |
| JP | 2001-086794 | 3/2001 |

* cited by examiner

MOTOR DRIVING APPARATUS

BACKGROUND OF THE INVENTION

1. Field of the Invention

The present invention relates to a motor driving apparatus for generating a large motor output torque.

2. Description of the Related Art

In order to drivingly control a large-capacity motor using an inverter unit, the inverter unit needs to be a large-capacity one. However, due to restrictions on components of an inverter unit, it is difficult to construct a single large-capacity inverter unit. Instead of using a single large-capacity inverter unit, a method is employed in which a large-capacity motor is drive-controlled by obtaining a large output from a plurality of small-capacity inverter units connected in parallel, equivalently.

FIG. 8 is a block diagram showing a control method conventionally employed in controlling a large-capacity motor using a plurality of inverter units.

A motor control unit 1 generates a plurality of motor driving commands and feeds them to a plurality (four in FIG. 8) of inverter units IV1 to IV4 arranged in parallel, individually, to thereby perform PWM control or the like on the inverter units IV1 to IV4 so that the inverter units IV1 to IV4 will drive a large-capacity motor 2 simultaneously. Thus, the inverter units IV1 to IV4 put together can drive-control the large-capacity motor 2, although they are each small in capacity.

Further, as a method of using two motors to drive a large-size movable piece for which acceleration/deceleration-control or the like by a single motor is difficult, a tandem control method is known to the public, in which two motors are driven with a single torque command (current command) generated by a motor control unit (see JP 8-16246A).

In order to feed motor driving commands to a plurality of inverter units individually, a motor control unit needs to generate the same number of motor driving commands as the inverter units. During this processing, a plurality of motor driving command generating parts are used exclusively for driving a single motor. This produces a problem that when other motors should be drive-controlled by the motor control unit, the number of other motors that can be drive-controlled are restricted.

SUMMARY OF THE INVENTION

The present invention provides a motor driving apparatus that can drive-control a plurality of inverter units with a single motor driving command from a motor control unit, and thereby control a large-capacity motor or the like.

A motor driving apparatus of the present invention comprises: a motor control unit for generating a motor driving command in accordance with an inputted motion command; a plurality of inverter units for supplying driving voltages to at least one motor; and an intermediary unit arranged between the motor control unit and the plurality of inverter units for issuing driving commands to the plurality of inverter units based on the motor driving command generated by the motor control unit.

The intermediary unit may be connected with the plurality of inverter units to perform serial data transmission, and may issue the driving commands to the plurality of inverter units serially based on the same motor driving command generated by the motor control unit.

Alternatively, the intermediary unit may be connected with the plurality of inverter units to perform parallel data transmission, and may issue the driving commands to the plurality of inverter units parallelly based on the same motor driving command generated by the motor control unit.

The driving commands may be transmitted from the intermediary unit to the plurality of inverter units as electric signals or optical signals.

The motor control unit may generate a torque command or a PWM command as the motor driving command.

The plurality of inverter units may respectively supply driving voltages to a plurality of sets of phase windings of a single motor. Alternatively, the plurality of inverter units may supply driving voltages to a single set of phase windings of a single motor.

The plurality of inverter units may supply driving voltages to a plurality of motors for cooperatively driving a single driven element, or to a plurality of linear motors to be driven in synchronism.

A casing of the intermediary unit may be provided independently of a casing of the motor control unit and a casing of the plurality of inverter units. Alternatively, the intermediary unit may be provided in a casing of the motor control unit or in a casing of the plurality of inverter units.

Since the intermediary unit issues the driving commands to the plurality of inverter units based on the same motor driving command generated by the motor control unit, the motor control unit is not required to generate a plurality of motor driving commands for the inverter units, so that processing load of the motor control unit is reduced. This makes it possible to apply ability of generating the plurality of motor driving commands of the motor control unit to driving of other independent motors. Thus, the restriction on the number of motor driving commands in parallel driving by the plurality of inverter units is obviated.

DETAILED DESCRIPTION

Figure 1:
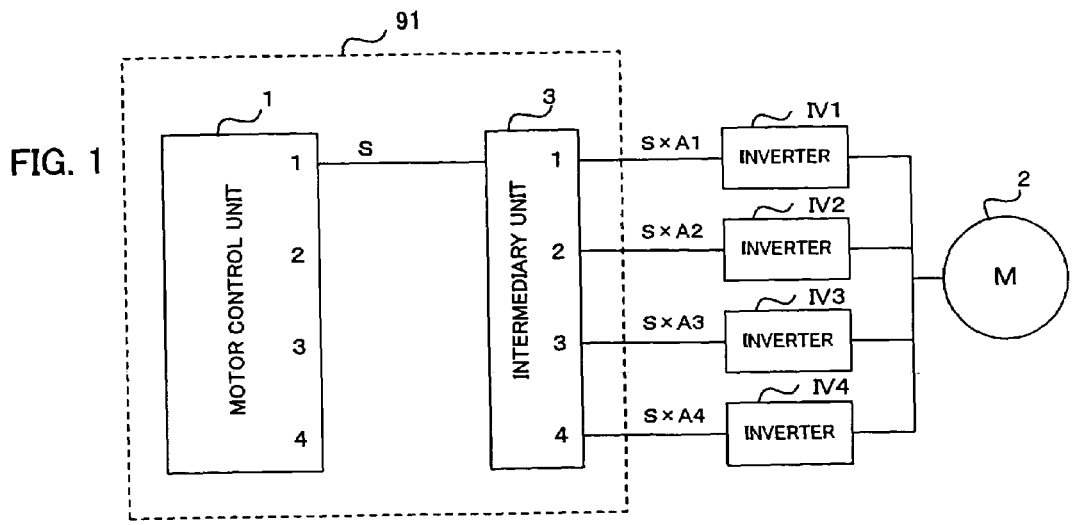
FIG. 1 is a block diagram showing a first embodiment of the invention.

FIG. 1 is a block diagram showing a first embodiment of the invention.

In the first embodiment, a motor control unit 1 such as a numerical control unit generates a torque command (current command) as a motor driving command S on the basis of a motion command fed according to a program or the like, and feeds it to an intermediary unit 3. On the basis of the motor driving command S from the motor control unit 1, the intermediary unit 3 sends out motor driving commands (torque commands) for a plurality (four in the example shown in FIG. 1) of inverter units IV1 to IV4 arranged in parallel, so that the inverter units IV1 to IV4 drive-control a large-capacity motor 2.

In this first embodiment, the motor control unit 1 sends out a motor driving command S in the form of parallel data, and the intermediary unit 3 feeds the motor driving command S to the inverter units IV1 to IV4 in the form of parallel data.

Figure 6:
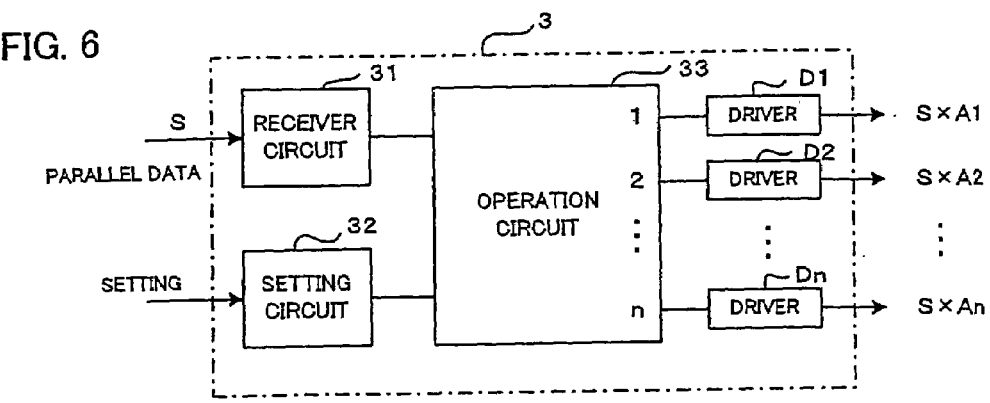
FIG. 6 is a block diagram showing relevant components of an intermediary unit for parallel connection used in embodiments of the invention.

FIG. 6 is a block diagram showing relevant components of the intermediary unit 3 for this parallel connection. The intermediary unit 3 comprises a receiver circuit 31, a setting circuit 32, an operation circuit 33, and drive circuits D1 to Dn corresponding in number to the inverter units IV1 to IVn. The motor driving command (torque command) S sent out from the motor control unit 1 in the form of parallel data is received by the receiver circuit 31. In the operation circuit 33, the motor driving command S is multiplied by each of coefficients $A_k$ (k=1 to n) corresponding to the inverter units IV1 to IVn (n=4 in the example of FIG. 1) individually, to generate motor driving commands $S \times A_k$ for the inverter units IV1 to IVn, and the motor driving commands $S \times A_k$ obtained are fed to the inverter units IV1 to IVn through the driver circuits D1 to Dn in the form of parallel data, simultaneously.

Specifically, in the example of FIG. 1, "$S \times A_1$" obtained by multiplying the motor driving command S by a coefficient $A_1$ set for the inverter unit IV1 is fed to the inverter unit IV1 through the driver D1 as a motor driving command (torque command). Likewise, "$S \times A_k$" obtained by multiplying the motor driving command S by a coefficient $A_k$ set for the inverter unit IVk (k=1 to n) is fed to the inverter unit IVk through the driver Dk as a motor driving command (torque command).

The coefficients $A_1$ to $A_n$ are set in advance by the setting circuit 32. If all the coefficients $A_1$ to $A_n$ are set to be "1", it means that the motor 2 is driven with a motor driving command (torque command) having n times the value of the motor driving command S sent from the motor control unit. Thus, the motor 2 is driven by a large current. In the example of FIG. 1, the motor 2 is driven with 4 times the value of the motor driving command S.

When the inverter units IV1 to IVn are the same in specification and capacity, the coefficients $A_1$ to $A_n$ may be set to be the same value, for example "1". When the inverter units IV1 to IVn are different in specification and/or capacity, the coefficients $A_1$ to $A_n$ for the inverter units IV1 to IVn should be set corresponding to the differences among the inverter units IV1 to IVn, and then adjusted so that the total output of the inverter units IV1 to IVn will be an optimum value within the capacity range of the large-capacity motor 2. Thus, only by changing the coefficients $A_1$ to $A_n$, a motor driving apparatus suitable for the capacity of the motor 2 can be obtained.

Figure 2:
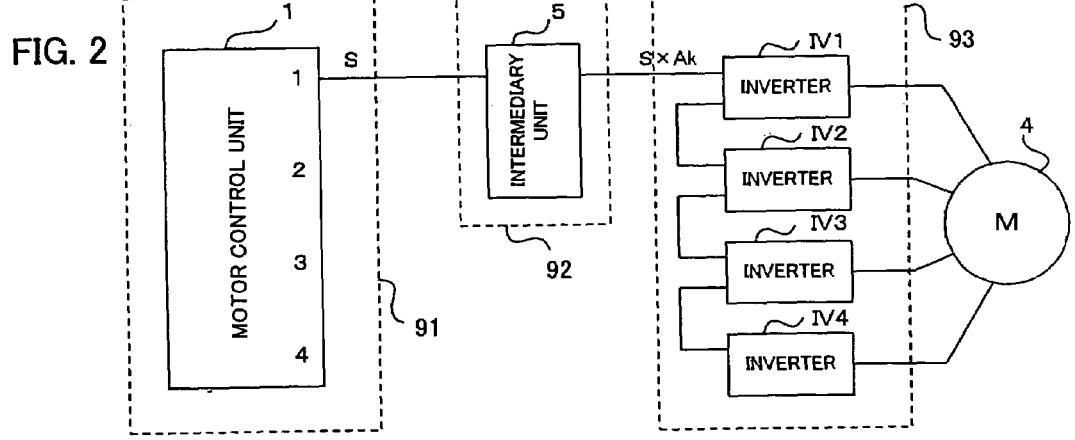
FIG. 2 is a block diagram showing a second embodiment of the invention.

FIG. 2 is a block diagram showing a second embodiment. In the second embodiment, a plurality (four in FIG. 2) of inverter units IV1 to IV4 are serial-connected to a motor control unit 1, and a large-capacity motor 4 is a motor having four pairs of phase windings.

The motor control unit 1 sends out a motor driving command (torque command) S in the form of serial data. An intermediary unit 5 receives the motor driving command S in the form of serial data, obtains motor driving commands for the inverter units IV1 to IV4, and send them out in the form of serial data at predetermined intervals. The inverter units IV1 to IV4 are connected in the daisy chain mode. The inverter units IV1 to IV4 each operate receiving their own motor driving command and control the drive voltage for their corresponding pair of windings. In the example shown in FIG. 4, the motor 4 has four pairs of windings, and four inverter units are provided so that each will supply and control the drive voltage for one of the four pairs of phase windings.

Figure 7:
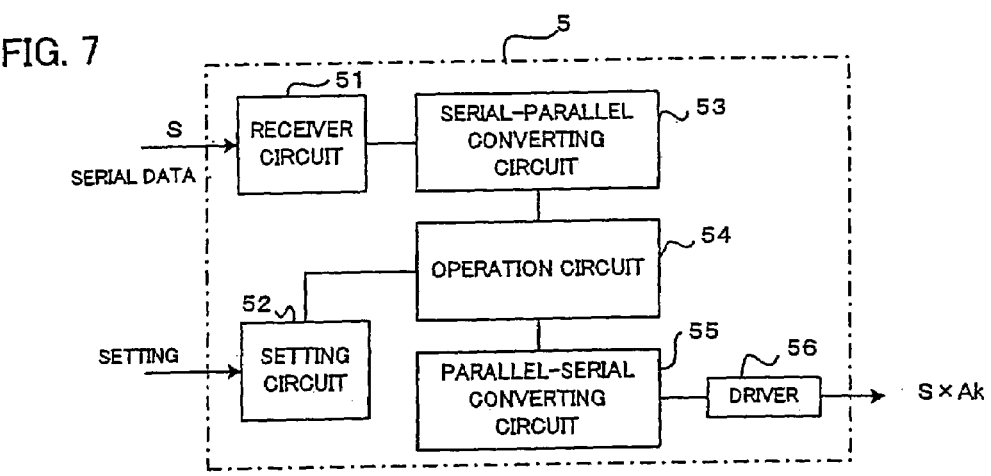
FIG. 7 is a block diagram showing relevant components of an intermediary unit for serial connection used in embodiments of the invention.
Figure 8:
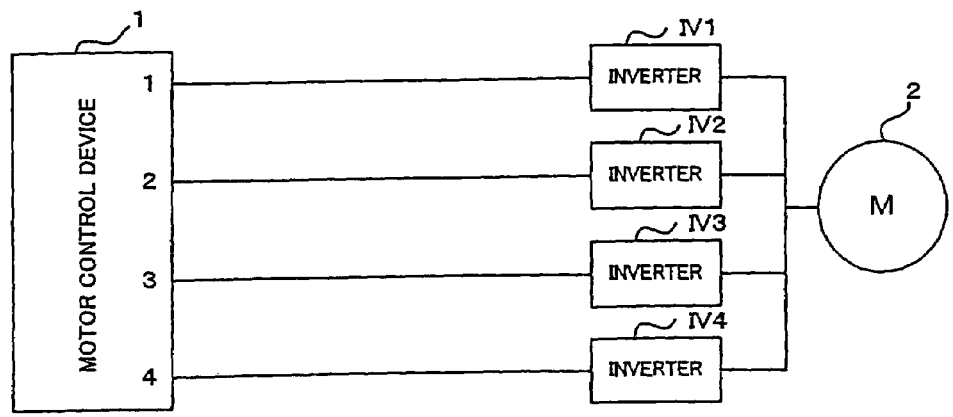
FIG. 8 is a block diagram showing a control method conventionally employed in controlling a motor using a plurality of inverter units.

FIG. 7 is a block diagram showing relevant components of the intermediary unit 5 used for this serial connection.

The intermediary unit 5 comprises a receiver circuit 51, a setting circuit 52, a serial-parallel converting circuit 53, an operation circuit 54, a parallel-serial converting circuit 55 and a driver circuit 56. The motor control unit 1 sends out a motor driving command (torque command) S in the form of serial data, which is received by the receiver circuit 51. The serial-parallel converting circuit 53 converts the serial data into parallel data. In the operation circuit 54, the motor driving command S converted into parallel data is multiplied by each of coefficients $A_1$ to $A_n$ (n=4 in the example of FIG. 2) set for the inverter units IV1 to IVn individually, to obtain motor driving commands (torque commands) $S \times A_1$ to $S \times A_n$ for the inverter units IV1 to IVn The motor driving commands $S \times A_1$ to $S \times A_n$ for the inverter units IV1 to IVn obtained are converted into serial data by the parallel-serial converting circuit 55, and sent out through the driver circuit 56 at predetermined intervals. The inverter units IV1 to IVn each read their own motor driving command (torque command), perform inverter-control on the basis of the command read, and thereby supply the drive voltage to their corresponding pair of windings of the motor 4 to drive-control the motor 4.

Also in the intermediary unit 5 used for this serial connection, the coefficients $A_1$ to $A_n$ for the inverter units IV1 to IVn are freely set in the setting circuit 52. In this respect, the intermediary unit 5 is similar to the intermediary unit 3 used for parallel connection shown in FIG. 6.

Figure 3:
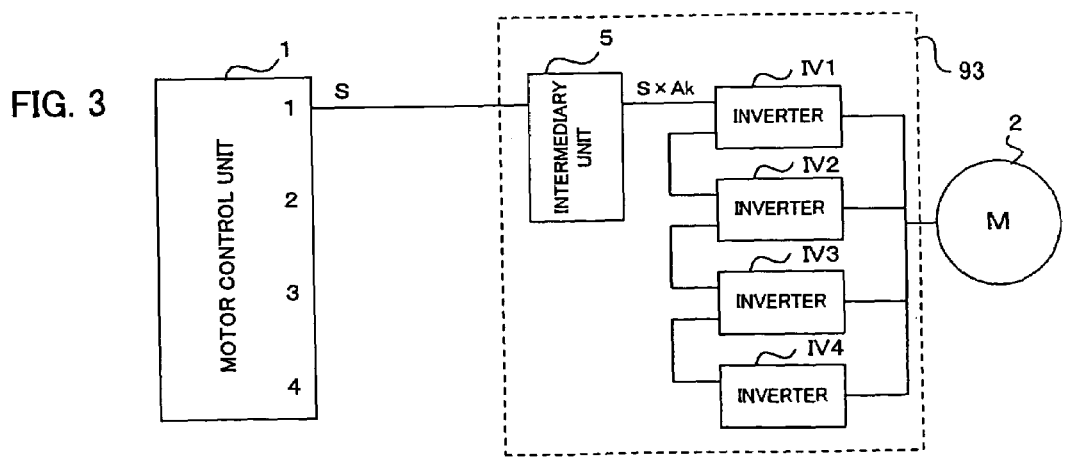
FIG. 3 is a block diagram showing a third embodiment of the invention.

FIG. 3 is a block diagram showing a third embodiment of the invention.

The third embodiment is an example in which a large-capacity motor 2 having a single pair of windings is drive-controlled by the inverter units IV1 to IV4 serial-connected to the motor control unit 1 shown in FIG. 2. From a motor driving command S in the form of serial data sent out from the motor control device 1, the intermediary unit 5 used for serial connection generates motor driving commands $S \times A_1$ to $S \times A_4$ for the inverter units IV1 to IV4, and sends them out. The process up to here is the same as that in the second embodiment shown in FIG. 2. The only difference is that the inverter units IV1 to IV4 drive-control the single pair of windings simultaneously (in this respect, the third embodiment is similar to the first embodiment shown in FIG. 1).

Incidentally, it is obvious that the first embodiment shown in FIG. 1 can be arranged to drive a motor having a plurality of pairs of windings, for example the motor 4 having four pairs of phase windings shown in FIG. 2. In this case, the output lines from the inverter units IV1 to IV4 in FIG. 1 are connected to their corresponding pairs of windings. It is to be noted that the pairs of phase windings and the inverter units do not always need to be connected one-to-one as shown in FIG. 2. It may be so arranged that a pair of windings is driven by a plurality of inverter units.

Figure 4:
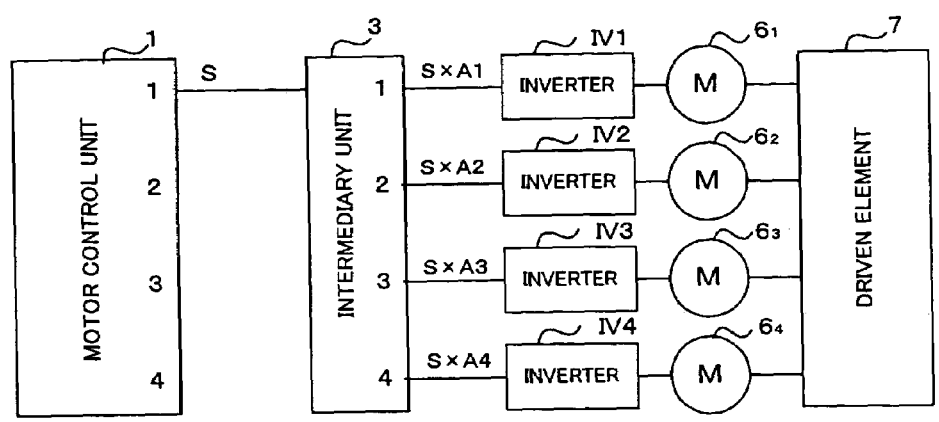
FIG. 4 is a block diagram showing a fourth embodiment of the invention.

FIG. 4 is a block diagram showing a fourth embodiment of the invention.

In the fourth embodiment, in place of the large-capacity motor 2 in the first embodiment shown in FIG. 1, a plurality (four) of motors $6_1$ to $6_4$ are provided to drive a single driven element 7.

The motor control unit 1 sends out a single motor driving command (torque command) S in the form of parallel data, and the intermediary unit 3 for parallel connection shown in FIG. 6 generates motor driving commands (torque commands) S×A1 to S×A4 for the inverter units IV1 to IV4 to drive the inverter units IV1 to IV4, individually. The process up to here is the same as that in the first embodiment and therefore will not be described in detail. The difference between the fourth and first embodiments is that the inverter units IV1 to IV4 each drive their corresponding one of the motors $6_1$ to $6_4$ so that the driven element 7 will be driven by the total output of these motors.

For a single motor driving command S, motor driving commands S×A1 to S×A4 each proportional to the motor driving command S are fed to the inverter units IV1 to IV4 simultaneously, and the inverter units IV1 to IV4 drive their corresponding motors $6_1$ to $6_4$. Thus, the motors are driven in synchronization, and the driven element 7 is driven by the total torque of the plurality (four) of motors $6_1$ to $6_4$.

Although the fourth embodiment is an example in which the inverter units IV1 to IV4 are parallel-connected to the motor control device 1, the inverter units may be serial-connected to the motor control device as shown in FIG. 2 to drive a plurality of motors to drive a single driven element 7. Specifically, in the case of FIG. 2, four motors are provided in place of the motor 4, and the inverter units IV1 to IV4 are each connected to one of the four motors so that a driven element 7 will be driven by all the four motors.

Figure 5:
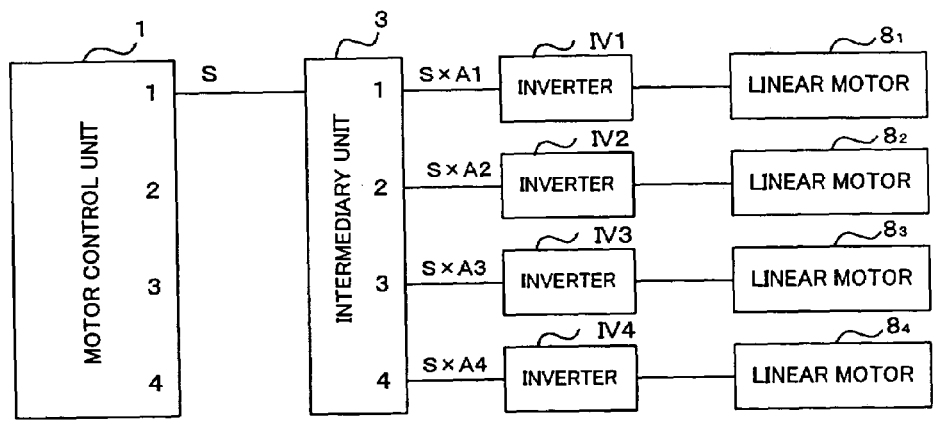
FIG. 5 is a block diagram showing a fifth embodiment of the invention.

FIG. 5 is a block diagram showing a fifth embodiment of the invention.

In the fifth embodiment, the invention is applied to linear motors. The only difference between the fifth embodiment and the fourth embodiment shown in FIG. 4 is that linear motors $8_1$ to $8_4$ are used in place of the motors 6.

The motor control unit 1 sends out a single motor driving command (torque command) S in the form of parallel data. The intermediary unit 3 for parallel connection shown in FIG. 6 generates motor driving commands (torque commands) S×A1 to S×A4 for the inverter units IV1 to IV4 to drive the inverter units IV1 to IV4, individually. The process up to here is the same as that in the first and fourth embodiments and therefore will not be described in detail. The inverter units each drive their corresponding one of the linear motors $8_1$ to $8_4$. The sliders of the linear motors $8_1$ to $8_4$ are connected to a driven element, and the driven element is driven by the total output torque of the plurality (four) of linear motors $8_1$ to $8_4$.

In the fifth embodiment, the inverter units IV1 to IV4 are parallel-connected, and the intermediary unit 3 for parallel connection shown in FIG. 6 is used. However, the inverter units may be serial-connected. Specifically, the inverter units IV1 to IV4 may be serial-connected to the motor control device 1 as shown in FIG. 2, using the intermediary unit 5 for serial connection shown in FIG. 7.

For the intermediary unit, the intermediary unit 3 for parallel connection and the intermediary unit 5 for serial connection were described. However, the intermediary unit may be arranged to receive a motor driving command S in the form of serial data from the motor control unit 1 and feed motor driving commands S×A1 to S×A4 in the form of parallel data to the inverter units IV1 to IV4. Specifically, an intermediary unit for feeding the motor driving commands S×A1 to S×A4 for the inverter units obtained in the operation circuit 54, in parallel, is obtained by removing the parallel-serial converting circuit 55 and the driver circuit 56 from the arrangement shown in FIG. 7 and providing the driver circuits D1 to Dn shown in FIG. 6, instead. Using this intermediary unit, it may be so arranged that a motor driving command S from the motor control unit 1 in the form of serial data is fed to the inverter units IV1 to IV4 in parallel.

Conversely, the intermediary unit may be arranged to receive a motor driving command S in the form of parallel data, convert it into serial data and feed the inverter units IV1 to IV4 with motor driving commands S×A1 to S×A4 in the form of serial data. It may be so arranged that this intermediary unit converts a motor driving command S sent from the motor control unit 1 in the form of parallel data into motor driving commands for the inverter units IV1 to IV4 in the form of serial data, and feeds these drive commands to the inverter units IV1 to IV4 connected in the form of daisy chain as shown in FIG. 2.

In the embodiments described above, the motor control unit 1 sends out a torque command (current command) as a motor driving command S. However, it may be so arranged that the motor control unit 1 makes a PWM command and sends out the PWM command as a motor driving command S. In this case, a PWM signal generating circuit does not need to be provided in each of the inverter units.

The intermediary unit can be provided in a casing 91 of the motor control unit 1 as shown in FIG. 1, or provided in a casing 92 independently of the casing 91 of the motor control unit 1 and a casing 93 of the inverter units. Alternatively, it can be provided in the casing 93 of the inverter units. The driving commands may be transmitted from the intermediary unit 3 or 5 to the inverter units IV1-IV4 as electric signals or as optical signals.

What is claimed is:

1. A motor driving apparatus, comprising:
    a motor control unit generating a single motor driving command in accordance with an inputted motion command;
    a plurality of inverter units supplying driving voltages to at least one motor; and
    an intermediary unit, arranged between said motor control unit and said plurality of inverter units, receiving the single motor driving command and including an operation circuit in which the single motor driving command is multiplied by a preset coefficient set for each of the inverter units to generate the same driving commands, the intermediary unit issuing the same driving commands to said plurality of inverter units based on the single motor driving command generated by said motor control unit.

2. A motor driving apparatus according to claim 1, wherein said intermediary unit is connected with said plurality of inverter units to perform serial data transmission, and issues the driving commands to said plurality of inverter units serially based on the same motor driving command generated by said motor control unit.

3. A motor driving apparatus according to claim 2, wherein the driving commands are transmitted from said intermediary unit to said plurality of inverter units as electric signals.

4. A motor driving apparatus according to claim 3, wherein said motor control unit generates a torque command as the motor driving command.

5. A motor driving apparatus according to claim 3, wherein said motor control unit generates a PWM command as the motor driving command.

6. A motor driving apparatus according to claim 2, wherein the driving commands are transmitted from said intermediary unit to said plurality of inverter units as optical signals.

7. A motor driving apparatus according to claim 6, wherein said motor control unit generates a torque command as the motor driving command.

8. A motor driving apparatus according to claim 6, wherein said motor control unit generates a PWM command as the motor driving command.

9. A motor driving apparatus according to claim 1, wherein said intermediary unit is connected with said plurality of inverter units to perform parallel data transmission, and issues the driving commands to said plurality of inverter units parallelly based on the same motor driving command generated by said motor control unit.

10. A motor driving apparatus according to claim 9, wherein the driving commands are transmitted from said intermediary unit to said plurality of inverter units as electric signals.

11. A motor driving apparatus according to claim 10, wherein said motor control unit generates a torque command as the motor driving command.

12. A motor driving apparatus according to claim 10, wherein said motor control unit generates a PWM command as the motor driving command.

13. A motor driving apparatus according to claim 9, wherein the driving commands are transmitted from said intermediary unit to said plurality of inverter units as optical signals.

14. A motor driving apparatus according to claim 13, wherein said motor control unit generates a torque command as the motor driving command.

15. A motor driving apparatus according to claim 13, wherein said motor control unit generates a PWM command as the motor driving command.

16. A motor driving apparatus according to claim 1, wherein said plurality of inverter units respectively supply driving voltages to a plurality of sets of phase windings of a single motor.

17. A motor driving apparatus according to claim 1, wherein said plurality of inverter units supply driving voltages to a single set of phase windings of a single motor.

18. A motor driving apparatus according to claim 1, wherein said plurality of inverter units supply driving voltages to a plurality of motors for cooperatively driving a single driven element.

19. A motor driving apparatus according to claim 1, wherein said plurality of inverter units supply driving voltages to a plurality of linear motors to be driven in synchronism.

20. A motor driving apparatus according to claim 1, wherein a casing of said plurality of intermediary units is provided independently of a casing of said motor control unit and a casing of said plurality of inverter units.

21. A motor driving apparatus according to claim 1, wherein said plurality of intermediary units are provided in a casing of said motor control unit.

22. A motor driving apparatus according to claim 1, wherein said plurality of intermediary units are provided in a casing of said plurality of inverter units.

* * * * *

UNITED STATES PATENT AND TRADEMARK OFFICE
CERTIFICATE OF CORRECTION

| | | |
|---|---|---|
| PATENT NO. | : 7,196,488 B2 | Page 1 of 1 |
| APPLICATION NO. | : 10/936543 | |
| DATED | : March 27, 2007 | |
| INVENTOR(S) | : Shunsuke Matsubara et al. | |

It is certified that error appears in the above-identified patent and that said Letters Patent is hereby corrected as shown below:

Column 4, Line 24, after "IVn" insert --.--.

Signed and Sealed this

Fourth Day of September, 2007

JON W. DUDAS
*Director of the United States Patent and Trademark Office*